US007233776B2

(12) United States Patent
Glass et al.

(10) Patent No.: US 7,233,776 B2
(45) Date of Patent: Jun. 19, 2007

(54) LOW VOLTAGE MICROELECTROMECHANICAL RF SWITCH ARCHITECTURE

(75) Inventors: Kevin W. Glass, Scottsdale, AZ (US); Bart R. McDaniel, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 420 days.

(21) Appl. No.: 10/879,544

(22) Filed: Jun. 29, 2004

(65) Prior Publication Data

US 2005/0285696 A1 Dec. 29, 2005

(51) Int. Cl.
*H04B 1/44* (2006.01)

(52) U.S. Cl. ........................ 455/78; 455/63.3; 455/561; 455/562.1; 363/16; 363/49; 363/21.8

(58) Field of Classification Search ............... 455/63.3, 455/78, 562.1, 561; 363/16, 49, 21.8, 21.4, 363/21.09

See application file for complete search history.

(56) References Cited

U.S. PATENT DOCUMENTS

| | | | | |
|---|---|---|---|---|
| 5,943,223 | A * | 8/1999 | Pond | 363/53 |
| 2001/0028543 | A1* | 10/2001 | Hayakawa et al. | 361/42 |
| 2002/0124385 | A1* | 9/2002 | Tsai et al. | 29/622 |
| 2004/0100341 | A1* | 5/2004 | Luetzelschwab et al. | 333/32 |
| 2004/0189142 | A1* | 9/2004 | Knieser et al. | 310/309 |
| 2005/0096878 | A1* | 5/2005 | Ivanciw et al. | 702/187 |
| 2005/0107125 | A1* | 5/2005 | Gilbert | 455/562.1 |
| 2005/0190115 | A1* | 9/2005 | Chiang et al. | 343/833 |

* cited by examiner

*Primary Examiner*—Matthew Anderson
*Assistant Examiner*—Tuan Pham
(74) *Attorney, Agent, or Firm*—Blakely, Sokoloff, Taylor & Zafman LLP

(57) ABSTRACT

According to one embodiment a microelectromechanical (MEMS) switch is disclosed. The MEMS switch includes a pulse generator to provide a low voltage source, a transformer coupled to the pulse generator to boost a voltage received from the pulse generator and a switch component coupled to the pulse generator. The switch component includes an actuation capacitor to store charge associated with the voltage received from the transformer.

18 Claims, 4 Drawing Sheets

LOW VOLTAGE MICROELECTROMECHANICAL RF SWITCH ARCHITECTURE

FIELD OF THE INVENTION

The present invention relates generally to micro-electromechanical systems (MEMS) and, more specifically, the present invention relates to a MEMS switch.

BACKGROUND

Micro-electromechanical systems (MEMS) devices have a wide variety of applications and are prevalent in commercial products. One type of MEMS device is a MEMS RF switch. A typical MEMS RF switch includes one or more MEMS switches arranged in an RF switch array. MEMS RF switches are ideal for wireless devices because of their low power characteristics and ability to operate in radio frequency ranges. MEMS RF switches are often found in cellular telephones, wireless computer networks, communication systems, and radar systems. In wireless devices, MEMS RF switches can be used as antenna switches, mode switches, and transmit/receive switches.

MEMS RF switches typically implement cantilever beam switching mechanisms, for example conductive beam and the insulated beam). The actuator capacitor of the switch is formed between a conductive plate of the cantilever beam and a control electrode that runs under the beam. When a voltage is applied to the control electrode, an electric field develops between the two plates.

The force of this electric field bends the cantilever beam down. When the beam deforms far enough, the switch makes contact, and is "closed". The voltage that closes the switch is called V pull-in ($V_{PI}$). Often a larger voltage than $V_{PI}$ is desirable to increase contact pressure and reduce contact resistance.

To de-actuate the switch, the voltage across the actuation capacitor drops below significantly below $V_{PI}$. There is inherent hysteresis between the actuation voltage and the de-actuation voltage. For instance, for a switch that has a actuator gap change from open to closed of $g_{final}<(2/3)\ g_0$, the de-actuation voltage will be approximately 1/3 the actuation voltage. Once the switch is actuated, the actuation capacitor voltage can leak down significantly, and the switch will remain closed. The hysteresis however slows down de-actuation to open the switch.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A high speed, low voltage MEMS switch architecture is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
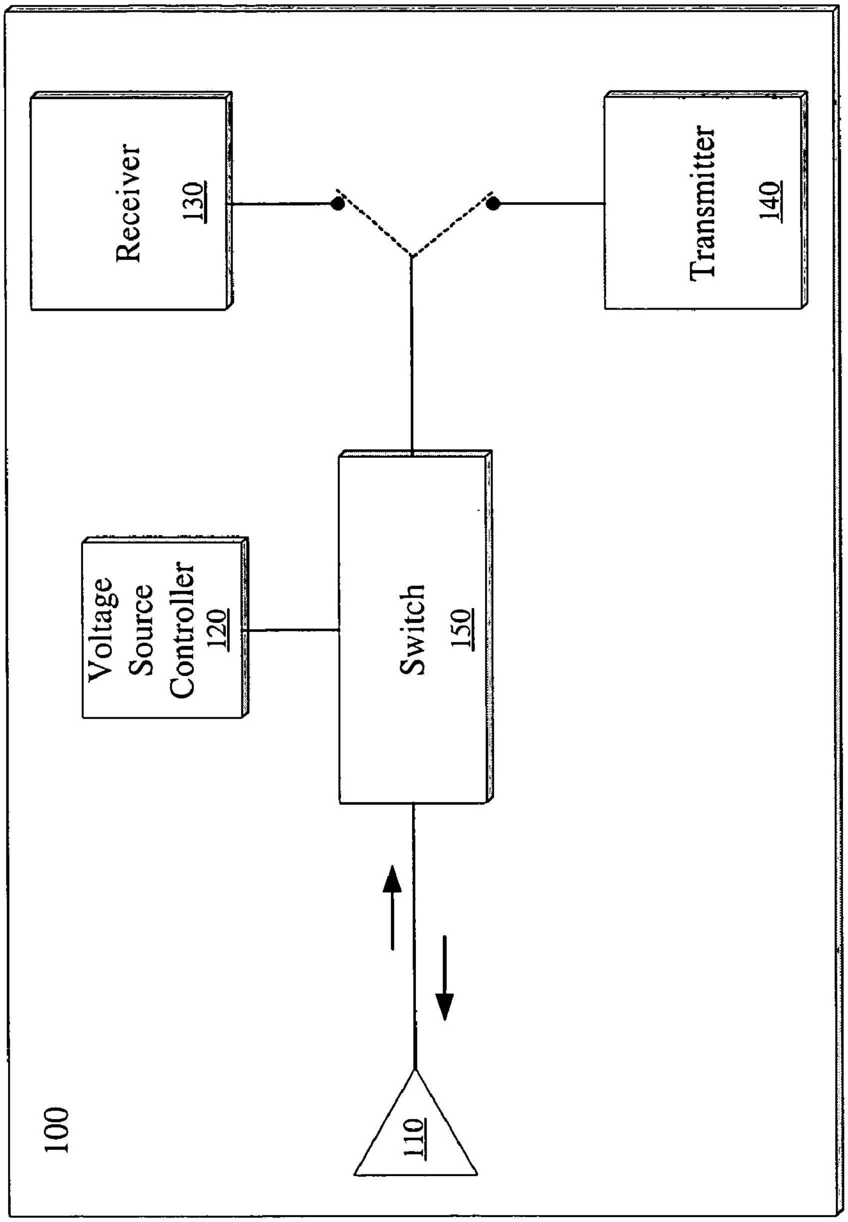
FIG. 1 illustrates one embodiment of a wireless communications system.

FIG. 1 is a block diagram of one embodiment of a wireless communication system 100. System 100 includes an antenna 110 for transmitting and receiving signals. System 100 also includes a voltage source controller 120, a receiver 130 a transmitter 140, and a MEMS switch 150 electrically coupled to antenna 110.

Voltage source controller 120 is electrically connected to MEMS switch 150. In one embodiment, voltage source controller 120 includes logic for selectively supplying voltages to actuation electrodes (not shown) within MEMS switch 150 to selectively activate switch 150. Receiver 130 processes signals that are received at system 100 via antenna 110. Transmitter 140 generates signals that are to be transmitted from system 100.

During operation, system 100 receives and transmits wireless signals. This is accomplished by voltage source controller 120 selectively activating MEMS switches 150 so that switch 150 is coupled to receiver 130 so that received signals can be transmitted from antenna 110 to receiver 130 for processing, and coupled to transmitter 140 so that transmitted signals generated by transmitter 140 can be passed to antenna 110 for transmission.

Figure 2:
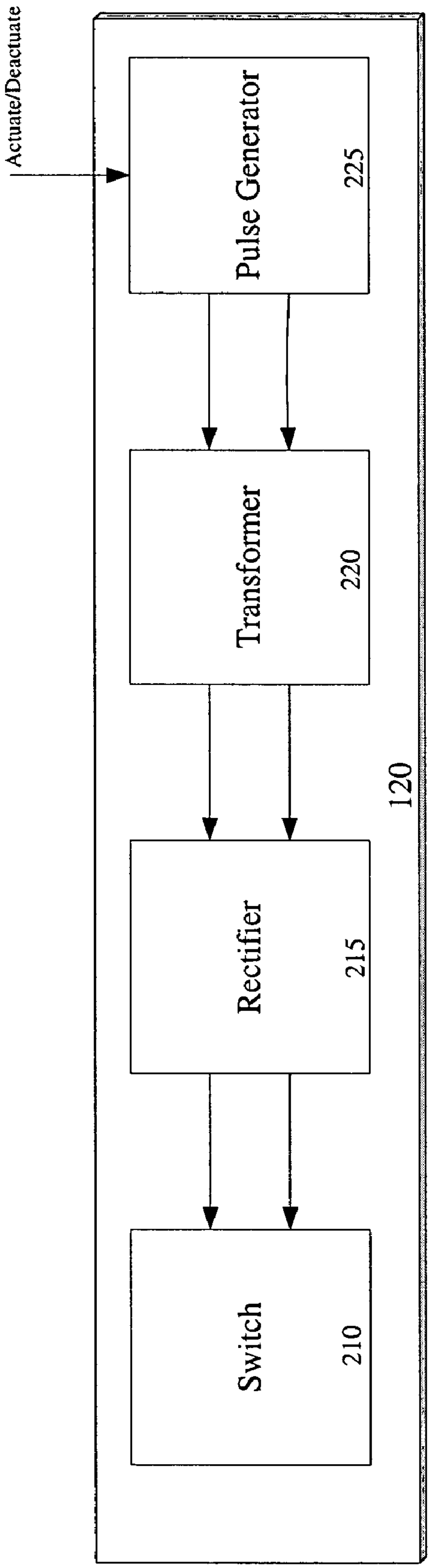
FIG. 2 is a block diagram illustrating one embodiment of a RF MEMS switch.
Figure 3:
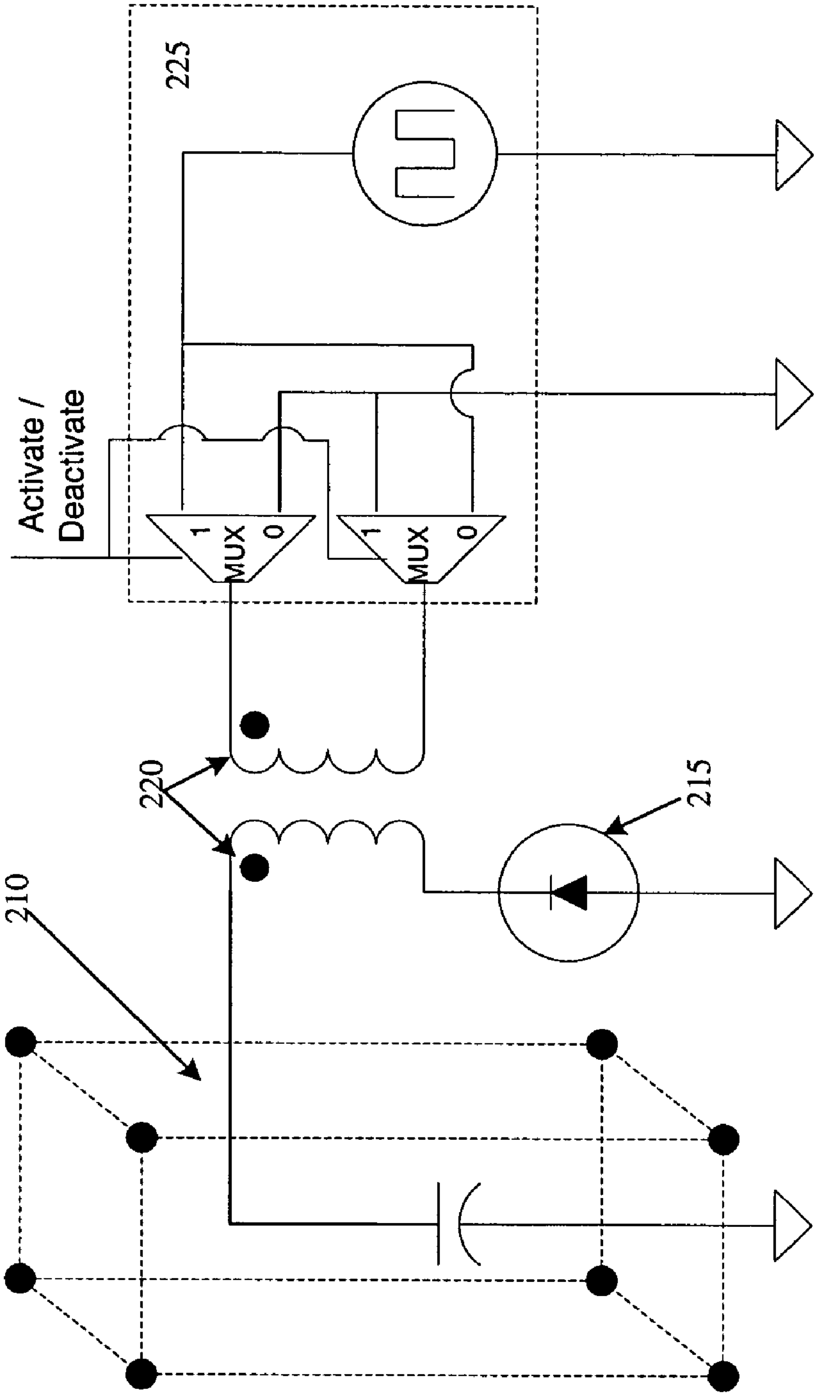
FIG. 3 is an electrical representation of one embodiment of a RF MEMS switch.

FIG. 2 is a block diagram illustrating one embodiment of a RF MEMS switch 150. Switch 150 includes a switch component 210, a rectifier 215, a transformer 220 and a pulse generator 225. FIG. 3 is an electrical diagram of one embodiment of switch 150.

Figure 5:
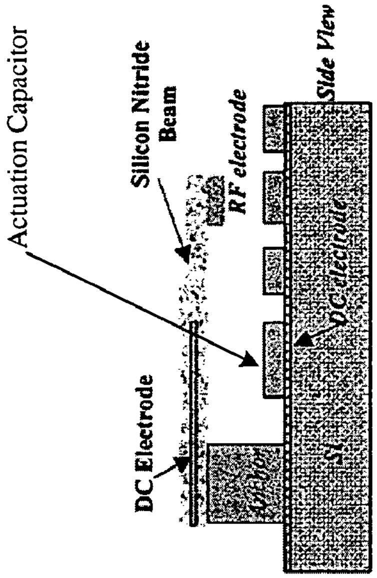
FIG. 5 illustrates one embodiment of an insulating beam MEMS RF switch.
Figure 4:
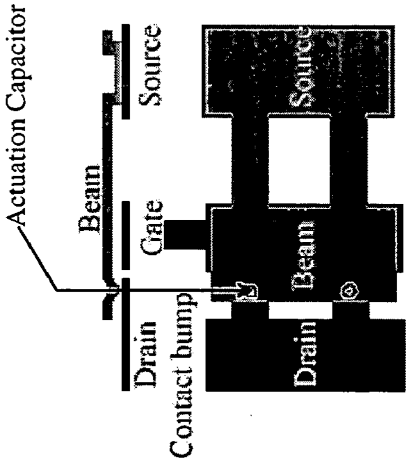
FIG. 4 illustrates one embodiment of a conductive beam MEMS RF switch.

Referring to FIG. 3, switch component 210 is a cantilever beam switch such as a conductive beam or insulated beam switch, which includes an actuary capacitor used to actuate component 210. FIG. 4 illustrated one embodiment of a conductive beam switch, while FIG. 5 illustrated one embodiment of an insulating beam switch. In an alternative embodiment, other types of switching mechanisms may be included without departing from the true scope of the invention.

Rectifier 215 is coupled to switch component 210. Rectifier 215 permits current to travel in only one direction within switch 150. In one embodiment, rectifier 215 is a diode that is the p-substrate on which switch 150 is fabricated. In such an embodiment, an n implant or diffusion may be used to implement the diode. Further, the substrate may be a lightly doped material, which enables the diode to be easily device engineered to have a high breakdown voltage.

Transformer 220 is a step-up transformer that boosts an input voltage received at switch 150 from a low voltage to a voltage sufficient to actuate switch component 210. In one embodiment, transformer 220 is implemented with an air core from the multilevel metallization available in the MEMS process along with available metal air bridges.

Pulse generator 225 provides actuation and de-actuation voltage transitions for switch 150. Pulse generator 225 receives an output phasing control signal that provides actuation and de-actuation voltage transitions. In one embodiment, pulse generator 225 is a digital pulsed wave modulator (PWM). However in other embodiments, pulse generator 225 may be implemented as a frequency variable generator.

Further, pulse generator 225 includes phase multiplexers coupled to the primary side of the transformer 220 coils. One multiplexer, when enabled, allows pulses to be delivered to the input terminal of transformer 220, while the other multiplexer allows pulses to be delivered to the output terminal of transformer 220. According to one embodiment, pulse generator 225 is included on a separate digital integrated circuit from the other switch 150 components.

In one embodiment, switch component 210 is actuated by a 0 to $V_{DD}$ voltage transition from pulse generator 225 on the in-phase transformer primary input (e.g., the side with the dot). The positive transition of the digital input provided by pulse generator 225 generates a current in the transformer secondary that is proportional to the input current by $I_{input}/N$ (the turns ratio of the transformer).

The current induced in the secondary is stored on the actuation capacitor, and generates a voltage. Subsequently, pulse generator 225 undergoes a negative transition back to ground. In response, the current is rectified out by the reverse biased diode. Afterwards another positive transition again occurs at the input, which results in the charge again being deposited on the actuation capacitor. This charge is added to the charge that was previously stored during the previous transition and results in an increased voltage. This is commonly referred to as "charge pumping".

Positive transitions on the input are continued until the voltage across the activation capacitor reaches its terminal value of $V_{input}$*N. According to one embodiment, this final voltage value may be greater than the switch component 210 activation voltage plus some guard banding. The number of input transitions occurring once the switch is closed is a function of the transformer primary current, the on resistance of the diode, and the final value of the actuator capacitance.

After the terminal voltage is achieved, the transitions on the input can be stopped, to reduce dynamic power dissipation. However in one embodiment, occasional single transitions on the input are implemented to maintain switch component 210 in the closed state. The frequency of these positive transitions is a function of the actuation capacitor value, and the reverse leakage current of the diode.

To de-actuate switch component 210, the multiplexer switches the pulse generator 225 output to the output of the phase input terminal on the transformer (the one without the dot). The positive transitions are rectified out, and the negative transitions "charge pump" down the voltage on the actuator capacitor. Pulses are applied until the approximate terminal value of 0V is reached. This process is the reverse of the actuation, with the exception that no maintenance pulses are required for the off state.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A microelectromechanical (MEMS) switch for a wireless communication system comprising:
- a pulse generator to provide a low voltage source, including:
  - a first multiplexer; and
  - a second multiplexer;
- a transformer, having a primary side coupled to the first multiplexer and the second multiplexer, to boost a voltage received from the pulse generator; and
- a switch component, coupled to the pulse generator, having an actuation capacitor to store charge associated with the voltage received from the transformer.

2. The switch of claim 1 further comprising a rectifier coupled between the transformer and the switch component.

3. The switch of claim 2 wherein the rectifier is a diode that is the p-substrate on which the MEMS switch is fabricated.

4. The switch of claim 3 wherein the substrate is a doped material that enables the diode to have a high breakdown voltage.

5. The switch of claim 1 wherein the transformer has an air core from multilevel metallization.

6. The switch of claim 1 wherein the pulse generator receives a control signal to indicate whether an actuation or de-actuation voltage is to be applied to the switch component.

7. The switch of claim 6 wherein the pulse generator is mounted on a separate integrated circuit from the transformer and the switch component.

8. The switch of claim 1 wherein the pulse generator is a digital pulsed wave modulator.

9. The switch of claim 1 wherein the pulse generator is a frequency variable generator.

10. A wireless communication system comprising:
- a receiver to receive high voltage RF signals;
- a transmitter to transmit the high voltage RF signals; and
- a microelectromechanical (MEMS) switch, coupled to the receiver and the transmitter, having:
  - a pulse generator to provide a low voltage source, including:
    - a first multiplexer; and
    - a second multiplexer;
  - a transformer to boost a voltage received from the pulse generator, having a primary side including:
    - an input component coupled to the first multiplexer; and
    - an output component coupled to the second multiplexer; and
  - a switch component, coupled to the pulse generator, having an actuation capacitor to store charge associated with the voltage received from the transformer.

11. The system of claim 10 wherein the MEMS switch further comprises a rectifier coupled between the transformer and the switch component.

12. The system of claim 10 wherein the pulse generator receives a control signal to indicate whether an actuation or de-actuation voltage is to be applied to the switch component.

13. The system of claim 10 wherein the pulse generator is a digital pulsed wave modulator.

14. The system of claim 10 wherein the pulse generator is a frequency variable generator.

15. A method for a wireless communication system comprising:
- generating a low voltage pulse at a pulse generator;

generating a high voltage at a transformer proportional to the low voltage pulse;

storing a charge associated with the high voltage at an actuation capacitor; and actuating a switch component once a sufficient magnitude of charge has been stored by the capacitor;

generating a second low voltage pulse at the pulse generator;

generating a second high voltage at the transformer; and storing a charge associated with the second high voltage at the actuation capacitor, wherein the charge is added to the charge that was previously stored.

16. The method of claim 15 further comprising:

the pulse generator transitioning to ground; and rectifying the current.

17. A wireless communication system comprising:

a receiver to receive high voltage RF signals;

a transmitter to transmit the high voltage RF signals;

a microelectromechanical (MEMS) switch, coupled to the receiver and the transmitter, having:

a pulse generator to provide a low voltage source, including:

a first multiplexer; and a second multiplexer;

a transformer to boost a voltage received from the pulse generator, having a primary side including:

an input component coupled to the first multiplexer; and an output component coupled to the second multiplexer; and a switch component, coupled to the pulse generator, having an actuation capacitor to store charge associated with the voltage received from the transformer; and an omni directional antenna coupled to the MEMS switch.

18. The system of claim 17 wherein the MEMS switch further comprises a rectifier coupled between the transformer and the switch component.

* * * * *